United States Patent
Kiriaki (10) Patent No.: US 12,209,504 B2
(45) Date of Patent: Jan. 28, 2025

(54) TURBINE AND TURBOCHARGER

(71) Applicant: IHI Corporation, Tokyo (JP)

(72) Inventor: Takuro Kiriaki, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/327,158

(22) Filed: Jun. 1, 2023

(65) Prior Publication Data

US 2023/0323891 A1 Oct. 12, 2023

Related U.S. Application Data

(63) Continuation of application No. PCT/JP2022/007655, filed on Feb. 24, 2022.

(30) Foreign Application Priority Data

Mar. 23, 2021 (JP) .................................. 2021-048180

(51) Int. Cl.
*F01D 25/24* (2006.01)
*F01D 17/10* (2006.01)

(52) U.S. Cl.
CPC ........... *F01D 17/105* (2013.01); *F01D 25/24* (2013.01); *F05D 2220/40* (2013.01)

(58) Field of Classification Search
CPC ..... F01D 17/105; F01D 25/24; F05D 2220/40
See application file for complete search history.

(56) References Cited

U.S. PATENT DOCUMENTS

| | | | | |
|---|---|---|---|---|
| 4,611,465 A | * | 9/1986 | Kato | ....................... F02B 37/02 |
| | | | | 60/602 |
| 10,920,659 B2 | * | 2/2021 | Morita | ..................... F02B 39/00 |
| 2013/0309106 A1 | | 11/2013 | Yanagida | |
| 2014/0363282 A1 | * | 12/2014 | Katou | ..................... F02B 47/08 |
| | | | | 415/204 |

(Continued)

FOREIGN PATENT DOCUMENTS

| JP | 61-33919 U | 3/1986 |
|---|---|---|
| JP | 2012-2094 A | 1/2012 |

(Continued)

OTHER PUBLICATIONS

International Search Report issued Apr. 26, 2022 in PCT/JP2022/007655 filed on Feb. 24, 2022 2 pages.

*Primary Examiner* — David E Sosnowski
*Assistant Examiner* — Jason G Davis
(74) *Attorney, Agent, or Firm* — Oblon, McClelland, Maier & Neustadt, L.L.P.

(57) ABSTRACT

Provided is a turbine, including: an accommodating portion configured to accommodate a turbine impeller; an exhaust flow passage configured to allow communication between the accommodating portion and an exhaust-air introduction port; a discharge flow passage configured to allow communication between the accommodating portion and an exhaust-air discharge port; a bypass flow passage configured to allow communication between the exhaust flow passage and the discharge flow passage while detouring the accommodating portion; and a branching portion between the exhaust flow passage and the bypass flow passage. The branching portion has a flow passage sectional area of 0.6 times or more a flow passage sectional area of the exhaust-air introduction port.

7 Claims, 6 Drawing Sheets

(56) References Cited

U.S. PATENT DOCUMENTS

| | | |
|---|---|---|
| 2015/0010390 A1 | 1/2015 | Onitsuka et al. |
| 2017/0152793 A1* | 6/2017 | Albrecht ................ F01N 13/00 |
| 2018/0216492 A1 | 8/2018 | Azuma et al. |

FOREIGN PATENT DOCUMENTS

| | | |
|---|---|---|
| JP | 2013-241898 A | 12/2013 |
| JP | 2015-14258 A | 1/2015 |
| JP | 2015-165096 A | 9/2015 |
| JP | 2018-87555 A | 6/2018 |

* cited by examiner

TURBINE AND TURBOCHARGER

CROSS REFERENCE TO RELATED APPLICATIONS

This application is a continuation application of International Application No. PCT/JP2022/007655, filed on Feb. 24, 2022, which claims priority to Japanese Patent Application No. 2021-048180, filed on Mar. 23, 2021, the entire contents of which are incorporated by reference herein.

BACKGROUND ART

Technical Field

The present disclosure relates to a turbine and a turbocharger. This application claims the benefit of priority to Japanese Patent Application No. 2021-048180 filed on Mar. 23, 2021, and contents thereof are incorporated herein.

Related Art

In a turbine provided in a turbocharger or the like, an accommodating portion that accommodates a turbine impeller is provided. The accommodating portion communicates with an exhaust-air introduction port through an exhaust flow passage, and communicates with an exhaust-air discharge port through a discharge flow passage. The turbine may include a bypass flow passage as disclosed in, for example, Patent Literature 1. The bypass flow passage allows communication between the exhaust flow passage and the discharge flow passage while detouring the accommodating portion.

CITATION LIST

Patent Literature

Patent Literature 1: JP 2013-241898 A

SUMMARY

Technical Problem

In the turbine including the bypass flow passage, in a branching portion between the exhaust flow passage and the bypass flow passage, separation of flow of gas is liable to occur. The separation of flow of gas in the branching portion increases pressure loss in the turbine, which is a cause of a decrease in efficiency of the turbine.

The present disclosure has an object to provide a turbine capable of improving efficiency of the turbine, and a turbocharger.

Solution to Problem

In order to solve the above-mentioned problem, according to the present disclosure, there is provided a turbine, including: an accommodating portion configured to accommodate a turbine impeller; an exhaust flow passage configured to allow communication between the accommodating portion and an exhaust-air introduction port; a discharge flow passage configured to allow communication between the accommodating portion and an exhaust-air discharge port; a bypass flow passage configured to allow communication between the exhaust flow passage and the discharge flow passage while detouring the accommodating portion; and a branching portion between the exhaust flow passage and the bypass flow passage, the branching portion having a flow passage sectional area of 0.6 times or more a flow passage sectional area of the exhaust-air introduction port.

In a region of the exhaust flow passage on the exhaust-air introduction port side with respect to the branching portion, a flow passage sectional area may be 0.9 times or more the flow passage sectional area of the exhaust-air introduction port in a region of 60% or more on the exhaust-air introduction port side in an extending direction of the exhaust flow passage.

In order to solve the above-mentioned problem, according to the present disclosure, a turbocharger includes the above-mentioned turbine.

Effects of Disclosure

According to the present disclosure, it is possible to improve the efficiency of the turbine.

DESCRIPTION OF EMBODIMENTS

Now, with reference to the attached drawings, an embodiment of the present disclosure is described. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

Figure 1:
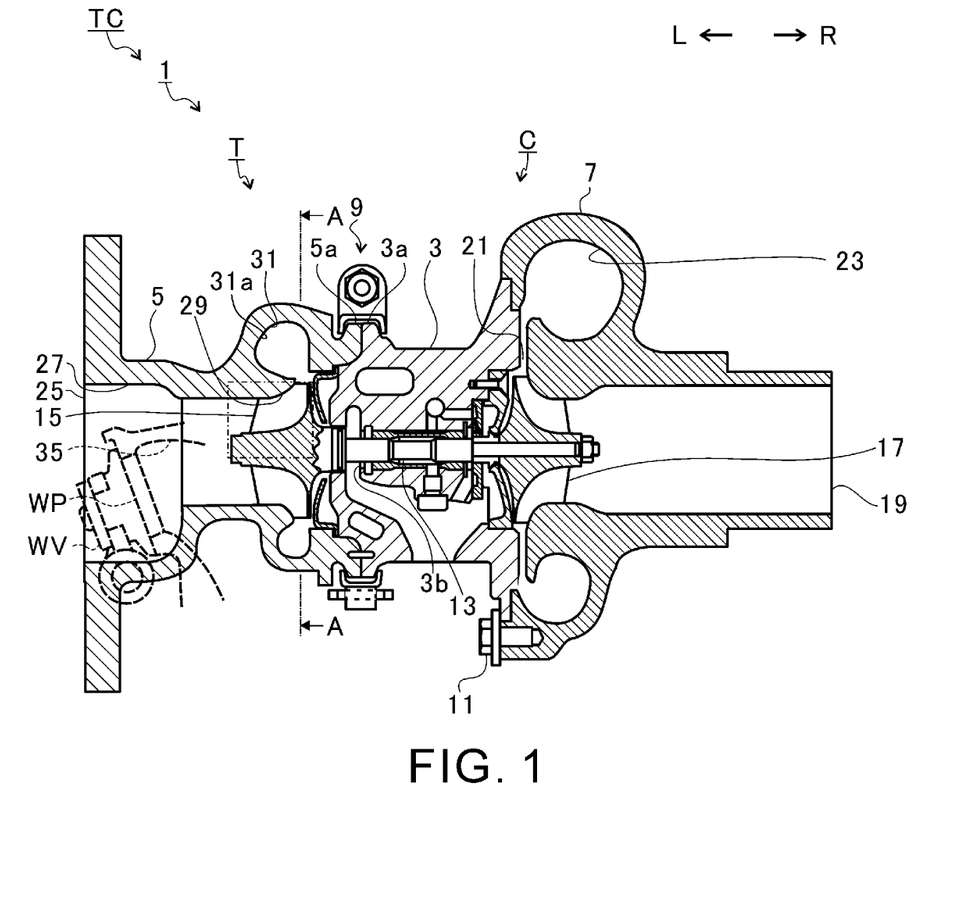
FIG. 1 is a schematic sectional view for illustrating a turbocharger according to an embodiment of the present disclosure.

FIG. 1 is a schematic sectional view for illustrating a turbocharger TC. In the following, description is given while a direction indicated by the arrow L illustrated in FIG. 1 corresponds to a left side of the turbocharger TC. A direction indicated by the arrow R illustrated in FIG. 1 corresponds to a right side of the turbocharger TC. As illustrated in FIG. 1, the turbocharger TC includes a turbocharger main body 1. The turbocharger main body 1 includes a bearing housing 3, a turbine housing 5, and a compressor housing 7. The turbine housing 5 is coupled to a left side of the bearing housing 3 by a fastening mechanism 9. The compressor housing 7 is coupled to a right side of the bearing housing 3 by a fastening bolt 11. The turbocharger TC includes a turbine T and a centrifugal compressor C. The turbine T includes the bearing housing 3 and the turbine housing 5. The centrifugal compressor C includes the bearing housing 3 and the compressor housing 7.

A protrusion 3a is formed on an outer peripheral surface of the bearing housing 3. The protrusion 3a is formed on the turbine housing 5 side. The protrusion 3a protrudes in a radial direction of the bearing housing 3. A protrusion 5a is formed on an outer peripheral surface of the turbine housing 5. The protrusion 5a is formed on the bearing housing 3 side. The protrusion 5a protrudes in a radial direction of the turbine housing 5. The bearing housing 3 and the turbine housing 5 are band-fastened by the fastening mechanism 9. The fastening mechanism 9 is, for example, a G coupling. The fastening mechanism 9 is configured to clamp the protrusion 3a and the protrusion 5a.

The bearing housing 3 has a bearing hole 3b formed therein. The bearing hole 3b passes through the bearing housing 3 in a right-and-left direction of the turbocharger TC. A bearing is arranged in the bearing hole 3b. A shaft 13 is inserted through the bearing. The bearing axially supports the shaft 13 in a rotatable manner. The bearing is a slide bearing. However, the present disclosure is not limited thereto, and the bearing may be a rolling bearing. A turbine impeller 15 is provided at a left end portion of the shaft 13. The turbine impeller 15 is accommodated in the turbine housing 5 so as to be rotatable. A compressor impeller 17 is provided at a right end portion of the shaft 13. The compressor impeller 17 is accommodated in the compressor housing 7 so as to be rotatable.

An intake port 19 is formed in the compressor housing 7. The intake port 19 is opened on the right side of the turbocharger TC. The intake port 19 is connected to an air cleaner (not shown). A diffuser flow passage 21 is defined by opposed surfaces of the bearing housing 3 and the compressor housing 7. The diffuser flow passage 21 increases pressure of air. The diffuser flow passage 21 has an annular shape. The diffuser flow passage 21 communicates with the intake port 19 on a radially inner side through intermediation of the compressor impeller 17.

A compressor scroll flow passage 23 is formed in the compressor housing 7. The compressor scroll flow passage 23 has an annular shape. The compressor scroll flow passage 23 is located, for example, on an outer side with respect to the diffuser flow passage 21 in a radial direction of the shaft 13. The compressor scroll flow passage 23 communicates with an intake port of an engine (not shown) and the diffuser flow passage 21. When the compressor impeller 17 rotates, the air is sucked from the intake port 19 into the compressor housing 7. The sucked air is pressurized and accelerated in the course of flowing through blades of the compressor impeller 17. The air having been pressurized and accelerated is increased in pressure in the diffuser flow passage 21 and the compressor scroll flow passage 23. The air having been increased in pressure is guided to the intake port of the engine.

An exhaust-air discharge port 25 is formed in the turbine housing 5. The exhaust-air discharge port 25 is opened on the left side of the turbocharger TC. The exhaust-air discharge port 25 is connected to an exhaust-gas purification device (not shown). In the turbine housing 5, a discharge flow passage 27, an accommodating portion 29, and an exhaust flow passage 31 are formed. The discharge flow passage 27 allows communication between the accommodating portion 29 and the exhaust-air discharge port 25. The discharge flow passage 27 is continuous with the accommodating portion 29 in a rotation axis direction of the turbine impeller 15. The accommodating portion 29 accommodates the turbine impeller 15. The exhaust flow passage 31 is formed on a radially outer side with respect to the turbine impeller 15. The exhaust flow passage 31 has an annular shape. The exhaust flow passage 31 includes a turbine scroll flow passage 31a. The turbine scroll flow passage 31a communicates with the accommodating portion 29. That is, the turbine impeller 15 is arranged on a radially inner side with respect to the turbine scroll flow passage 31a.

The exhaust flow passage 31 communicates with an exhaust manifold of an engine (not shown). Exhaust gas exhausted from the exhaust manifold of the engine (not shown) is guided to the discharge flow passage 27 through the exhaust flow passage 31 and the accommodating portion 29. The exhaust gas guided to the discharge flow passage 27 rotates the turbine impeller 15 in the course of flowing.

A rotational force of the turbine impeller 15 is transmitted to the compressor impeller 17 through the shaft 13. When the compressor impeller 17 rotates, the pressure of the air is increased as described above. In such a manner, the air is guided to the intake port of the engine.

Figure 2:
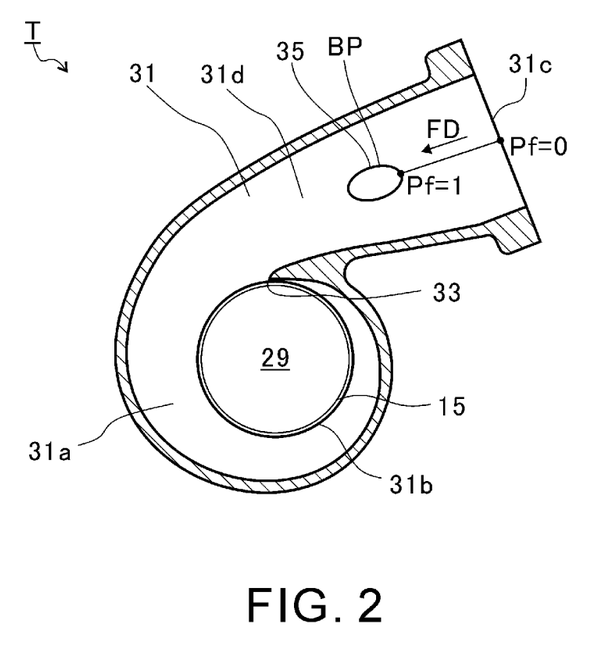
FIG. 2 is a sectional view taken along the line A-A in FIG. 1.

FIG. 2 is a sectional view taken along the line A-A in FIG. 1. In FIG. 2, regarding the turbine impeller 15, only an outer periphery of the turbine impeller 15 is indicated by a circle. As illustrated in FIG. 2, on a radially outer side of the accommodating portion 29 (that is, a radially outer side of the turbine impeller 15), the exhaust flow passage 31 is formed. The exhaust flow passage 31 includes the turbine scroll flow passage 31a, a communication portion 31b, an exhaust-air introduction port 31c, and an exhaust-air introduction passage 31d. The exhaust flow passage 31 allows communication between the accommodating portion 29 and the exhaust-air introduction port 31c.

The communication portion 31b is formed into an annular shape over the entire periphery of the accommodating portion 29. The turbine scroll flow passage 31a is located on the radially outer side of the turbine impeller 15 with respect to the communication portion 31b. The turbine scroll flow passage 31a is formed into an annular shape over the entire periphery of the communication portion 31b (that is, the entire periphery of the accommodating portion 29). The communication portion 31b allows communication between the accommodating portion 29 and the turbine scroll flow passage 31a. A tongue portion 33 is formed in the turbine housing 5. The tongue portion 33 is formed on an end portion of the turbine scroll flow passage 31a on a downstream side, and partitions the turbine scroll flow passage 31a into a downstream portion and an upstream portion of the turbine scroll flow passage 31a.

The exhaust-air introduction port 31c is opened to the outside of the turbine housing 5. The exhaust gas exhausted from the exhaust manifold of the engine (not shown) is introduced into the exhaust-air introduction port 31c. The exhaust-air introduction passage 31d is formed between the exhaust-air introduction port 31c and the turbine scroll flow passage 31a. The exhaust-air introduction passage 31d connects the exhaust-air introduction port 31c and the turbine scroll flow passage 31a to each other. The exhaust-air introduction passage 31d is formed, for example, into a straight shape. The exhaust-air introduction passage 31d guides the exhaust gas introduced from the exhaust-air introduction port 31c to the turbine scroll flow passage 31a. The turbine scroll flow passage 31a guides the exhaust gas introduced from the exhaust-air introduction passage 31d to the accommodating portion 29 through the communication portion 31b.

A bypass flow passage 35 is formed in the turbine housing 5. An inlet end of the bypass flow passage 35 is opened to the exhaust flow passage 31 (specifically, the exhaust-air introduction passage 31d). An outlet end of the bypass flow passage 35 is opened to the discharge flow passage 27 (see FIG. 1). The bypass flow passage 35 allows communication between the exhaust flow passage 31 (specifically, the exhaust-air introduction passage 31d) and the discharge flow passage 27 while detouring the accommodating portion 29. At the outlet end of the bypass flow passage 35, a wastegate port WP (see FIG. 1) is formed. At the outlet end of the bypass flow passage 35, a wastegate valve WV (see FIG. 1) that can open and close the wastegate port WP is arranged. The wastegate valve WV is arranged in the discharge flow passage 27. When the wastegate valve WV opens the wastegate port WP, the bypass flow passage 35 causes part of the exhaust gas flowing through the exhaust-air introduction passage 31d to flow out to the discharge flow passage 27 while detouring the accommodating portion 29 (that is, detouring the turbine impeller 15).

In the turbine T, opening and closing operations of the wastegate port WP are controlled to adjust a flow rate of the exhaust gas flowing into the turbine impeller 15. As described above, the turbine T is a variable capacity turbine.

Here, in the turbine T including the bypass flow passage 35, in a branching portion BP between the exhaust flow passage 31 and the bypass flow passage 35 (that is, the inlet end of the bypass flow passage 35), separation of flow of gas is liable to occur. For example, when the wastegate port WP is closed, part of the exhaust gas flowing through the exhaust-air introduction passage 31d flows into the bypass flow passage 35 from the branching portion BP, and then, returns to the exhaust-air introduction passage 31d. At this time, in a portion of the branching portion BP on the downstream side, separation of flow of gas may occur. The separation of flow of gas in the branching portion BP increases pressure loss in the turbine T, which is a cause of a decrease in efficiency of the turbine T.

In view of this, in the turbine T according to the present embodiment, in order to improve the efficiency of the turbine T, the exhaust flow passage 31 (specifically, the exhaust-air introduction passage 31d) is devised in flow passage sectional area. The flow passage sectional area of the exhaust flow passage 31 is, specifically, the area of the flow passage section orthogonal to a flow direction FD of the exhaust gas (that is, an extending direction of the exhaust flow passage 31). In the following, with reference to FIG. 2 to FIG. 5, the flow passage sectional area of the exhaust flow passage 31 is described in detail.

A position of the exhaust gas in the flow direction FD in the exhaust flow passage 31 is hereinafter referred to as a flow-direction position Pf. As illustrated in FIG. 2, the flow-direction position Pf at the exhaust-air introduction port 31c is set to 0, and the flow-direction position Pf at the branching portion BP is set to 1. A region of the exhaust flow passage 31 in which the flow-direction position Pf is 0 or more and less than 1 corresponds to a region on the exhaust-air introduction port 31c side with respect to the branching portion BP. In the example of FIG. 2, the flow-direction position Pf at the branching portion BP is a position of an upstream end portion of the branching portion BP. However, as the flow-direction position Pf at the branching portion BP, a position of a portion other than the upstream end portion of the branching portion BP may be used.

Figure 3:
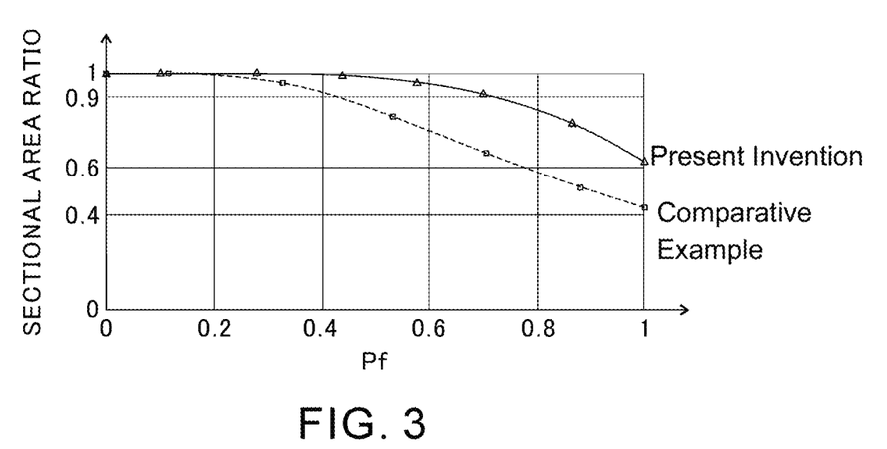
FIG. 3 is a graph for showing a distribution of a sectional area ratio of a flow passage sectional area of an exhaust flow passage at each flow-direction position to a flow passage sectional area of an exhaust-air introduction port in a turbine according to the embodiment of the present disclosure.

FIG. 3 is a graph for showing a distribution of a sectional area ratio of the flow passage sectional area of the exhaust flow passage 31 at each flow-direction position Pf to the flow passage sectional area of the exhaust-air introduction port 31c in the turbine T according to the present embodiment. In FIG. 3, the distribution of the sectional area ratio in the present embodiment is indicated by the solid line, and the distribution of the sectional area ratio in a comparative example is indicated by the broken line.

As shown in FIG. 3, both in the present embodiment and in the comparative example, in the region of the exhaust flow passage 31 on the exhaust-air introduction port 31c side with respect to the branching portion BP, the sectional area ratio decreases as the flow-direction position Pf is closer to the downstream side. That is, in the region of the exhaust flow passage 31 on the exhaust-air introduction port 31c side with respect to the branching portion BP, the flow passage sectional area decreases as the flow-direction position Pf is closer to the downstream side.

In this case, in the comparative example, at the flow-direction position Pf=1, the sectional area ratio is less than 0.6 (specifically, about 0.4). That is, the flow passage sectional area of the branching portion BP is less than 0.6 times the flow passage sectional area of the exhaust-air introduction port 31c. Meanwhile, in the present embodiment, at the flow-direction position Pf=1, the sectional area ratio is 0.6 or more (specifically, about 0.6). That is, the flow passage sectional area at the branching portion BP is 0.6 times or more the flow passage sectional area of the exhaust-air introduction port 31c.

In the following, description is given with reference to FIG. 4, FIG. 5, and FIG. 6 for showing results obtained by flow analysis simulations conducted by the inventor. In the flow analysis simulations, states of the flow of gas (for example, a direction, a speed, and entropy) in the exhaust flow passage 31 and the efficiency of the turbine T are calculated.

Figure 4:
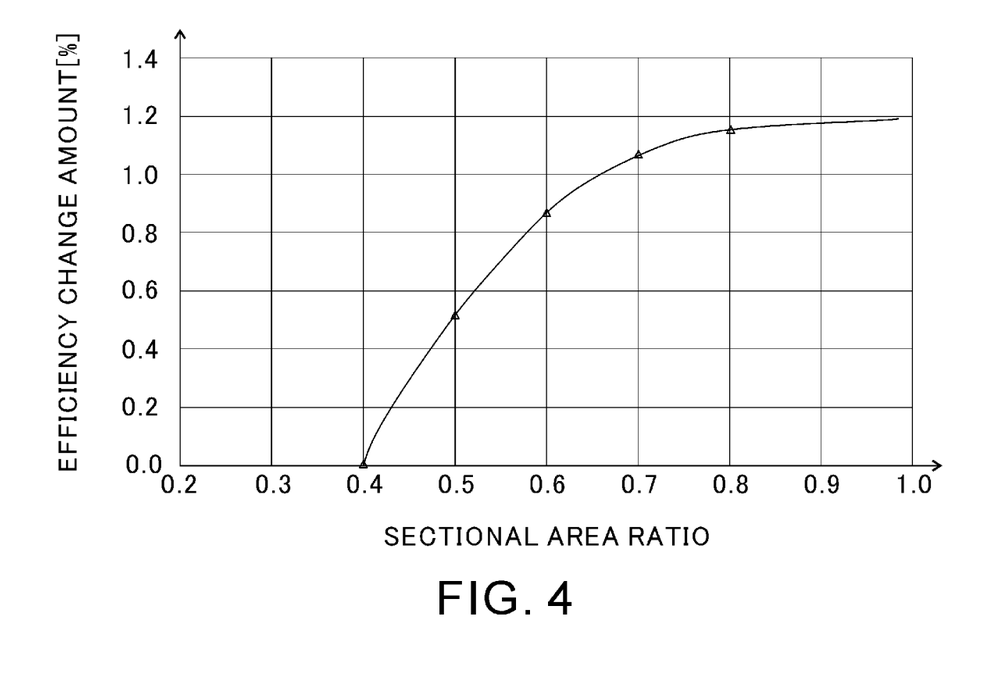
FIG. 4 is a graph for showing a relationship between a sectional area ratio and an efficiency change amount.

FIG. 4 is a graph for showing a relationship between a sectional area ratio and an efficiency change amount. The sectional area ratio is a ratio of the flow passage sectional area of the branching portion BP to the flow passage sectional area of the exhaust-air introduction port 31c (that is, a ratio of the flow passage sectional area at the flow-direction position Pf=1 to the flow passage sectional area at the flow-direction position Pf=0). The efficiency change amount [%] is a change amount of the efficiency of the turbine T in each sectional area ratio with respect to the efficiency of the turbine T when the sectional area ratio is 0.4. That is, the efficiency change amount [%] is obtained by subtracting the efficiency of the turbine T when the sectional area ratio is 0.4 from the efficiency of the turbine T in each sectional area ratio. The efficiency of the turbine T is a ratio of energy generated by the turbine T to energy input to the turbine T.

According to the graph shown in FIG. 4, it is found that, as the sectional area ratio increases, the efficiency of the turbine T increases. In particular, it is found that, when the sectional area ratio is 0.6 or more, the efficiency of the turbine T is improved by at least 0.8% or more as compared to a case in which the sectional area ratio is 0.4. Thus, in the present embodiment, it is found that, when the flow passage sectional area of the branching portion BP is 0.6 times or more the flow passage sectional area of the exhaust-air introduction port 31c, the efficiency of the turbine T is remarkably improved.

Figure 5:
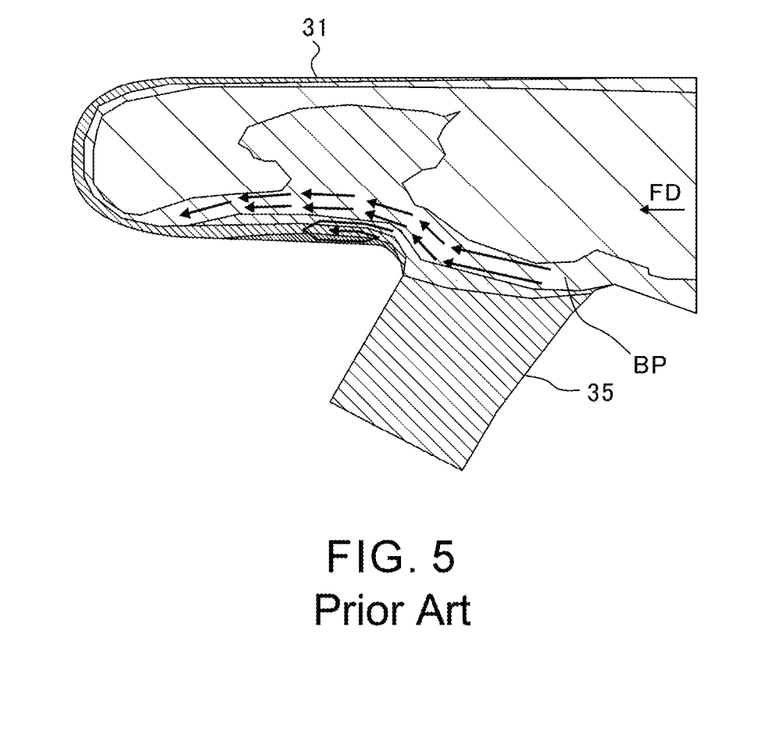
FIG. 5 is a diagram for illustrating an entropy distribution obtained by a flow analysis simulation in a comparative example.

FIG. 5 is a diagram for illustrating an entropy distribution obtained by the flow analysis simulation in the comparative example. FIG. 6 is a diagram for illustrating an entropy distribution obtained by the flow analysis simulation in the present embodiment. In FIG. 5 and FIG. 6, the distribution of entropy in the vicinity of the branching portion BP in the exhaust flow passage 31 is indicated by contrasting density of hatching. Specifically, in FIG. 5 and FIG. 6, as the density of hatching is higher (that is, as intervals of hatched lines are smaller), the entropy is higher. Further, in FIG. 5 and FIG. 6, a direction of local flow of gas in the vicinity of the branching portion BP is indicated by arrows.

Figure 6:
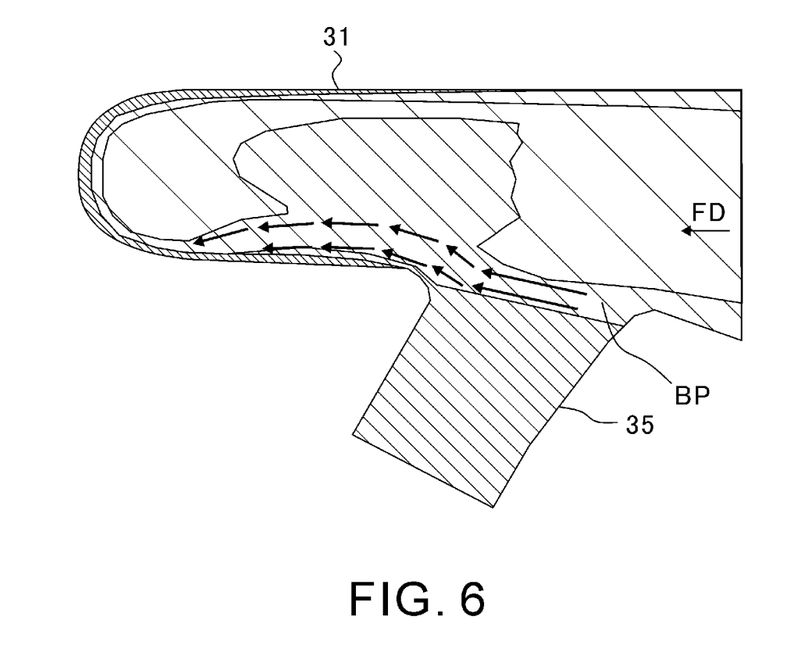
FIG. 6 is a diagram for illustrating an entropy distribution obtained by a flow analysis simulation in the present embodiment.

As a result of comparison between the comparative example illustrated in FIG. 5 and the present embodiment illustrated in FIG. 6, it is found that, in the comparative example, entropy increases on the downstream side of the exhaust flow passage 31 with respect to the branching portion BP (left side in FIG. 5 and FIG. 6) as compared to the present embodiment. Further, in the comparative example, it is found that separation of flow of gas and vortex flow occur on the downstream side of the exhaust flow passage 31 with respect to the branching portion BP unlike the present embodiment.

In this case, it is conceivable that the efficiency of the turbine T changes in accordance with the size of the flow passage sectional area of the branching portion BP. Specifically, when the flow passage sectional area of the branching portion BP is excessively small, the flow speed of the exhaust gas flowing through the exhaust flow passage 31 (specifically, the exhaust-air introduction passage 31d) excessively increases at the branching portion BP. With this, in the vicinity of the branching portion BP (for example, the downstream side of the exhaust flow passage 31 with respect to the branching portion BP), separation of flow of gas and vortex flow are liable to occur. For this reason, in the comparative example (that is, when the sectional area ratio is about 0.4), it is assumed that separation of flow of gas and vortex flow occur in the vicinity of the branching portion BP. In contrast, in the present embodiment (that is, when the sectional area ratio is 0.6 or more), the flow passage sectional area of the branching portion BP is large as compared to the comparative example, and hence the flow speed of the exhaust gas is small at the branching portion BP. With this, separation of flow of gas and vortex flow in the vicinity of the branching portion BP are suppressed, and as a result of the reduction of the pressure loss, the efficiency of the turbine T is improved.

In view of improving the flow passage efficiency to improve the turbine efficiency, it is preferred that the sectional area ratio gently decrease as the flow-direction position Pf is closer to the downstream side in the region of the exhaust flow passage 31 on the exhaust-air introduction port 31c side with respect to the branching portion BP. Specifically, in the present embodiment, as shown in FIG. 3, in a range in which the flow-direction position Pf is 0 or more and 0.6 or less, the sectional area ratio is 0.9 or more. With this, as shown in FIG. 4 and FIG. 6, improvement of the flow passage efficiency and the turbine efficiency is achieved appropriately. As described above, in view of improving the flow passage efficiency to improve the turbine efficiency appropriately, it is preferred that the flow passage sectional area is 0.9 times or more the flow passage sectional area of the exhaust-air introduction port 31c in a region of 60% or more on the exhaust-air introduction port 31c side in the flow direction FD of the exhaust gas (that is, the extending direction of the exhaust flow passage 31).

An embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

In the above, an example in which the turbine T is a single scroll type (type in which the number of the turbine scroll flow passage 31a is one) has been described, but the type of the turbine T is not limited to the above-mentioned example. For example, the turbine T may be a double scroll type (type in which two turbine scroll flow passages 31a are connected to the accommodating portion 29 at different peripheral direction positions), or may be a twin scroll type (type in which two turbine scroll flow passages 31a are arranged side by side in an axial direction).

In the above, an example in which the turbine T is provided in the turbocharger TC has been described. However, the turbine T may be provided in other devices other than the turbocharger TC.

The invention claimed is:

1. A turbine, comprising:
   a turbine housing including
      an accommodating portion configured to accommodate a turbine impeller;
      an exhaust flow passage configured to allow communication between the accommodating portion and an exhaust-air introduction port;
      a discharge flow passage configured to allow communication between the accommodating portion and an exhaust-air discharge port;
      a bypass flow passage configured to allow communication between the exhaust flow passage and the discharge flow passage while detouring the accommodating portion; and
      a branching portion between the exhaust flow passage and the bypass flow passage, the branching portion having a flow passage sectional area of 0.6 times or more a flow passage sectional area of the exhaust-air introduction port,
   wherein the flow passage sectional area of the branching portion is smaller than the flow passage sectional area of the exhaust-air introduction port.

2. The turbine according to claim 1, wherein, in a region of the exhaust flow passage on the exhaust-air introduction port side with respect to the branching portion, a flow passage sectional area is 0.9 times or more the flow passage sectional area of the exhaust-air introduction port in a region of 60% or more on the exhaust-air introduction port side in an extending direction of the exhaust flow passage.

3. A turbocharger, comprising the turbine of claim 1.

4. A turbocharger, comprising the turbine of claim 2.

5. The turbine according to claim 1, wherein the turbine is a single scroll turbine.

6. The turbine according to claim 1, wherein the turbine is a double scroll turbine.

7. The turbine according to claim 1, wherein the turbine is a twin scroll turbine.

* * * * *